March 16, 1937.  L. L. GRAY  2,073,930

SPECIALIZED LUBRICATION SYSTEM AND MEANS

Original Filed Dec. 25, 1931   5 Sheets-Sheet 1

Inventor

Leil L. Gray,

By Leonard L. Kalish
Attorney

March 16, 1937. L. L. GRAY 2,073,930
SPECIALIZED LUBRICATION SYSTEM AND MEANS
Original Filed Dec. 25, 1931  5 Sheets-Sheet 2

Fig. 3.

INVENTOR
By Leil L. Gray,
Leonard L. Kalish Attorney

March 16, 1937.　　　L. L. GRAY　　　2,073,930
SPECIALIZED LUBRICATION SYSTEM AND MEANS
Original Filed Dec. 25, 1931　　5 Sheets-Sheet 5

Inventor
Leil L. Gray,
By Leonard L. Kalish
Attorney

Patented Mar. 16, 1937

2,073,930

UNITED STATES PATENT OFFICE 2,073,930

SPECIALIZED LUBRICATION SYSTEM AND MEANS

Leil L. Gray, Minneapolis, Minn.

Original application December 25, 1931, Serial No. 583,159. Divided and this application August 15, 1932, Serial No. 628,864

9 Claims. (Cl. 221—47.5)

My invention relates to a new and useful specialized lubrication system and means, whereby the application of the various different grades and types of lubricant or other plastic or fluid materials may be applied to the various parts of an automobile with the highest degree of certainty and accuracy.

This application is a division of my application Serial No. 583,159, filed December 25, 1931.

In the complete lubrication or servicing of automobiles, a number of distinctly different lubricants and other plastic and fluid materials are required in the various moving parts, and these lubricants and other plastic and fluid materials must be periodically replenished at certain intervals.

For the successful and efficient maintenance of an automobile, it is essential that each part of the automobile requiring servicing be attended to and serviced at the particular intervals required, and it is also essential that each part of the automobile receive none other than the particular lubricant or other material specially adapted for it. Thus, the application of the wrong material to any particular part of the automobile may be just as detrimental as the failure to replenish the particular part with any material whatever. Thus, the wrong lubricant applied to any part of the automobile requiring lubrication may be injurious to that part, just as lack of lubrication would be.

Owing to the large number of different makes of automobiles, and owing more particularly to the varying equipment found on almost each different make of automobile, the efficient lubrication or servicing of automobiles on a commercial scale has been rendered more and more complex and has constantly required a greater reliance upon the memory, skill, knowledge and attention of the operator charged with the servicing or lubrication of the automobile.

Thus, many parts of automobiles which require periodic lubrication or servicing, are of different construction on different makes of automobiles, and each different construction requires a different grade or type of lubricant for its efficient maintenance. Thus, while the universal joint on one make of automobile may require oil for its efficient lubrication, on another make of automobile the universal joint may require grease for its proper lubrication; and on still another make of automobile, the universal joint may require no lubrication whatever. So too, the shackles or the front wheel bearings or other parts, may require one type of lubrication or servicing on one make of car, and may require a different type of lubrication or servicing on another make of car.

So also, the points, or parts, or zones of an automobile which may require servicing or lubrication, vary with many makes of automobiles, so that the operator may readily overlook and neglect the lubrication or servicing of a particular part of an automobile with which he is not particularly familiar.

In order to overcome these difficulties in the servicing of automobiles, I have devised a system and means of lubrication, whereby the accuracy, correctness and completeness of a servicing or lubrication job on an automobile is insured to the greatest extent possible, with the minimum of reliance upon the memory, skill, or attention of the various operators charged with the work.

My invention further relates to means whereby the specialized servicing or lubrication of automobiles is also much facilitated.

With the above and other objects in view, which will appear more fully from the following detailed description, my invention consists of a system of lubrication or servicing, whereby the operator is guided in the application of the various lubricants to the various parts of different makes of automobiles in a manner which requires little or no discretion on his part, and little or no knowledge of the equipment and lubrication requirements of the various makes of automobiles, so that when the system is once placed in operation, the completeness, the correctness and accuracy of lubrication of automobiles is insured regardless of the make of automobiles, and regardless of the variations in the equipment of the automobiles and variations in their lubrication requirements.

My invention further consists in means, whereby the handling of the lubricant, grease, oil or the handling of the other liquid or plastic materials required in the servicing of automobiles from beginning to end, is facilitated and whereby the chances of an inadvertent confusion or interchange of different materials is reduced to a minimum.

My invention further consists of other novel features, which will appear more fully from the following detailed description.

For the purpose of illustrating my invention, I have shown in the accompanying drawings forms thereof which are at present preferred by me, since the same have been found in practice to give satisfactory and reliable results, although it is to be understood that the various instrumentalities of which my invention consists, can be variously arranged and organized, and that my invention is not limited to the precise form, arrangement and organization of these instrumentalities as herein shown and described.

Referring to the drawings in which like reference characters indicate like parts.

Figure 1:
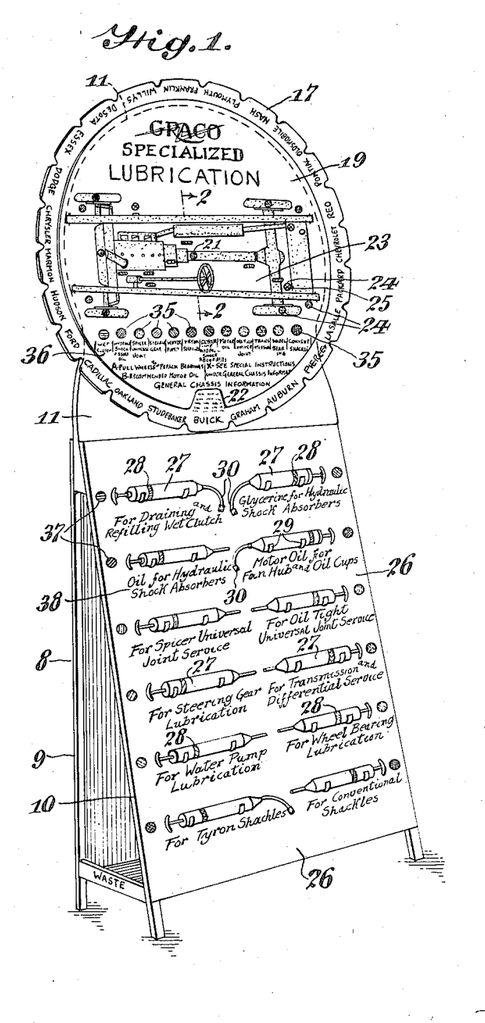
Figure 1 represents a perspective view of a specialized lubrication system embodying my invention.

In the embodiment of my invention, as shown particularly in Figure 1, I provide any suitable rack 8, which may be either stationarily mounted at a suitable location in the service station, or which may be moved about on castors, wheels, or the like. The rack 8 may be formed of any suitable upright members 9 and 10, which converge towards each other upwardly, and to the upper ends of which a pivot member 11 is secured.

The pivot member 11 may be either solid or hollow. In the modification indicated by the sectional view in Figure 2, this member 11 is hollow, and forms a compartment or casing for one or several electric lights 12, carried in suitable sockets 13, and being suitably connected to a source of electric current supply by means of electrical conductors or wires 14. The pivot member 11 (whether it is solid or hollow) carries a pivot 15, preferably non-revolubly mounted therein. On the reduced-diameter portion 16 of the pivot 15, projecting beyond the pivot member or support 11, a disc 17 is rotatably mounted. On the portion 18 of the pivot, an outermost disc or plate 19 is stationarily mounted. A nut or other fastening means 20 may be threaded onto an outermost threaded portion 21 of the pivot, thereby to lock the assemblage of pivot support, movable disc 17 and stationary disc 19 in operative relation to each other. In the particular embodiment illustrated in detail in Figure 2, the major shank portion of the pivot 15 is made square or of any other suitable polygonal shape, or is otherwise keyed to the pivot support member 11, so that it will not rotate with respect thereto, while the reduced-diameter portion 16 is round, and the outer portion 18 of the pivot is again square so that the outermost disc or plate 19 will not rotate on the pivot but will be retained stationarily.

The diameter of the outer stationary disc plate 19 is less than the diameter of the revolubly mounted disc or plate 17, so that the latter projects outwardly in a radial direction beyond the plate 19. The projecting portion of the plate 17 is suitably notched or otherwise subdivided at suitable intervals around its circumference;—each subdivision corresponding to a particular make, kind, or type of automobile, and the particular make, kind or type of automobile is then inscribed upon the projecting peripheral portions as indicated in Figure 1 (also Fig. 3).

The stationary disc 19 is provided with a notch or other marking 22, preferably at the bottom.

On the front or stationary plate 19, the general outline of an automobile chassis is shown, either by embossing the same with or without coloration, or by printing, lithographing or otherwise portraying such general outline of an automobile chassis upon the plate 19. The plate 19 may be made of enamelled steel or other metal, with the outline of the chassis imposed and further accentuated by the use of contrasting colored enamel. The chassis 23 on the front plate 19, is a composite chassis and not the chassis of any single make, kind or type of automobile, and is so arranged as to show, at least in general outline or diagrammatically, all the parts, points or zones which require lubrication or servicing on every make, kind or type of automobile, and not merely those parts, points or zones requiring lubrication or servicing on one make or type of automobile alone.

Apertures, holes or openings 24 are provided through the front stationary plate 19, in close proximity to or in operative juxtaposition to each part, point or zone on this composite automobile chassis which requires lubrication or servicing on any and all makes, types or kinds of automobiles. These apertures may be round or oblong or any other suitable shape.

The rotary or movable plate 17, is in turn provided with a separate set of distinctive markings, such as distinctive color markings, corresponding to each make of automobile shown on the periphery of the plate 17;—each set of these distinctive markings being so arranged on the plate 17, that when said plate 17 is turned to the proper position with respect to the plate 19, these color markings will register with the openings or apertures 24, so that they may be visually observed through said apertures 24. Each set of markings corresponding to each make of automobile is spaced angularly with respect to each other set of markings, so that the set of markings corresponding to any particular make of automobile will be brought into registering alignment with the set of apertures 24, when the name of the particular make of automobile is brought into alignment with the notch or other marking 22 on the stationary plate 19.

These sets of markings 35 may be variously and distinctively colored spots appropriately distributed over the surface of the plate 17 (behind the plate 19), or they may be that many different numbers or letters or other symbols or marks.

Upon the front panel 26, carried by the upright members 10, I mount a series of fluid or plastic dispensing pumps or "guns" identified generally by the numeral 27, which carry a set of distinctive marks 28 on the barrel of the pump or on the handle of the pump, or both, corresponding to the markings on the rotary plate 17. These "guns" or dispensing pumps are suitably supported upon brackets 29, each dispensing pump or "gun" 27 is filled with a lubricant or other plastic or fluid material required in the servicing or lubrication of automobiles, and in the further extension of this system, which will be described more in detail hereinafter, the lubricants or other plastic or fluid materials with which these series of "guns" are filled, are also colored or dyed corresponding to the color markings on the "guns".

The dispensing pumps or "guns" are provided with suitable outlet nozzles or hoses and suitable coupling or connecting devices 30, whereby the discharge outlets of these "guns" or pumps may be conveniently attached to or connected with the various parts of the automobiles to which the respective guns or pumps are applicable.

As each automobile is placed on the lift or over the pit of the service station, to be lubricated or serviced, the disc 17 is turned until the peripheral space thereof bearing the name of the particular automobile to be lubricated is brought into juxtaposition or alignment with the notch or marking 22 in the stationary plate 19. This brings into registration with the set of apertures 24 in the front plate 19 (carrying a representation of a composite chassis), the particular set of corresponding markings on the movable plate 17, which indicate, in association with the series of variously charged "guns" or pumps 27, the service or lubrication requirements of the particular make of automobile and which also at the same time at once associate the various guns or pumps indicated, with the particular parts, points or zones of the automobile chassis to which these guns or pumps are specially applicable.

Thus, after having turned the disc or positioned the disc 17 so that the peripheral section bearing the name of the particular automobile is brought into juxtaposition to the notch 22, the operator has merely to view the representation of the composite chassis on the plate 19, and then remove from the rack 8 the gun or pump 27 bearing the same marking as appears through any particular aperture 24 in the plate 19. The gun is then applied to the automobile at the particular part, point or zone with which the particular aperture 24 is associated on the composite chassis on the plate 19. This operation is repeated until each of the parts, points or zones having an associated aperture through the plate 19, are lubricated or serviced with a gun or pump having the same marking as appears through the particular aperture.

If on any particular make of automobile, a particular part, point or zone on the chassis requires no lubrication or servicing whatever, then the corresponding marking may be omitted on the plate 17, or some color like black may be employed, to indicate that no lubrication or servicing is required at that part, point or zone on the particular make of automobile. If numbers or letters are used, as the indicating means on the plate 17, then the omission of any number or letter may be sufficient, while if distinctive colors or colored spots are employed as the indicating means, then black or some other predetermined color may be employed to indicate that no lubrication or servicing is required at that particular part, point or zone on that particular automobile.

In the simpler embodiments of this invention, the markings, be they distinctively colored spots or be they letters, numbers or other symbols, may be merely placed upon the surface of the plate 17 in proper location with respect to the apertures 24 and with respect to the particular peripheral segments on the plate 17, and these markings may be printed, lithographed or otherwise applied to the surface of the plate 17. In this embodiment the plate 17 would merely be a solid plate without any perforations.

If desired, the plate 17 may be perforated at the points or spots which register with the apertures 24 in each of the several predetermined positions of the plate 17, (corresponding to the different makes of cars), and a suitable colored, translucent or transparent panel 32 is placed over these apertures;—said transparent or translucent panels 32 being variously colored to correspond to the lubricant requirement indications of the various makes of automobiles. In this embodiment of my invention, corresponding apertures 33 are also provided in the juxtaposed wall 34 of the pivot supporting member 11, so that the light from any suitable source, such as electric bulbs 12, may be transmitted through the transparent or translucent panels 32, so that the particular indications appearing through the apertures 24 in the stationary plate 19 will be illuminated, and hence more conspicuous. In this modification also, wherever no servicing or lubrication is required on the particular part of an automobile, the corresponding aperture 31 in the plate 17 may be omitted or an opaque panel may be provided, so that no light will come through that particular aperture 24. Instead of the light passing through differently colored panels, these panels may be translucent, and various other forms of indicating means may be applied thereto, such as numbers, letters or other symbols which will appear conspicuously because of the different degree of transparency.

By this means, the operator in a service station is not required to know or to be familiar with the equipment (shackle construction; universal joint; wheel bearing; water pump bearing; etc.) of the various makes of automobiles, nor need he be familiar with the lubrication requirements of these different parts of the various makes of automobiles. All that the service operator need do is to turn the disc 17 to the point where the segment bearing the name of the automobile is brought into alignment with the registering point or notch 22 of the stationary disc 19, and then to apply to each of the parts, points or zones on the chassis of the automobile, the guns or pumps having the same color or other markings appearing through the apertures 24 on the plate 19. In this manner mistakes and confusions are minimized, and the complete, correct and efficient lubrication of automobiles is assured.

If desired also, a permanent series of markings 35 may also be provided on the front plate or disc 19, corresponding to the entire series of different guns or pumps;—a certain number of which will be applicable to each automobile. Beneath these permanent markings 35 (color markings, numbers, letters or other symbols), or in operative juxtaposition thereto, a printed legend 36 may be provided, denoting the name of the particular part or zone of the automobile, and the particular type of construction of such part, to which the color marking or other marking corresponds, or denoting the particular lubricant or other material contained in the correspondingly marked gun or pump. So too, beneath or in operative relation to each set of brackets 29 on the rack panel 26, a corresponding set of markings 37, and a corresponding set of legends 38 may be provided, whereby the operator may automatically familiarize himself with the equipment of each make of automobile and with its lubricant requirements, as he performs his work.

The varying or different cross-hatchings used in the drawings on the spots 25 (on the disc 17) and on the spots 35 (on the disc 19), as well as on the spots 37 (on the panel 26) as well as on the bands 28 (on the guns 27), are intended to indicate different distinctive or contrasting colors. In place of these colors, numbers or letters, or other symbols may be used.

Figure 2:
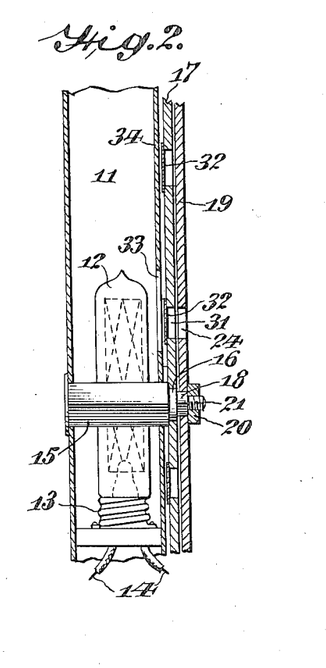
Figure 2 represents a section on line 2—2 of Figure 1, on a much enlarged scale.

In the detailed illustration shown in Figure 2, I have shown merely the embodiment wherein the illumination is employed. Where no illumination is desired, the plate 17 would be merely a solid disc without perforations, and the pivot supporting member 11 could also be solid instead of hollow.

Figure 3:
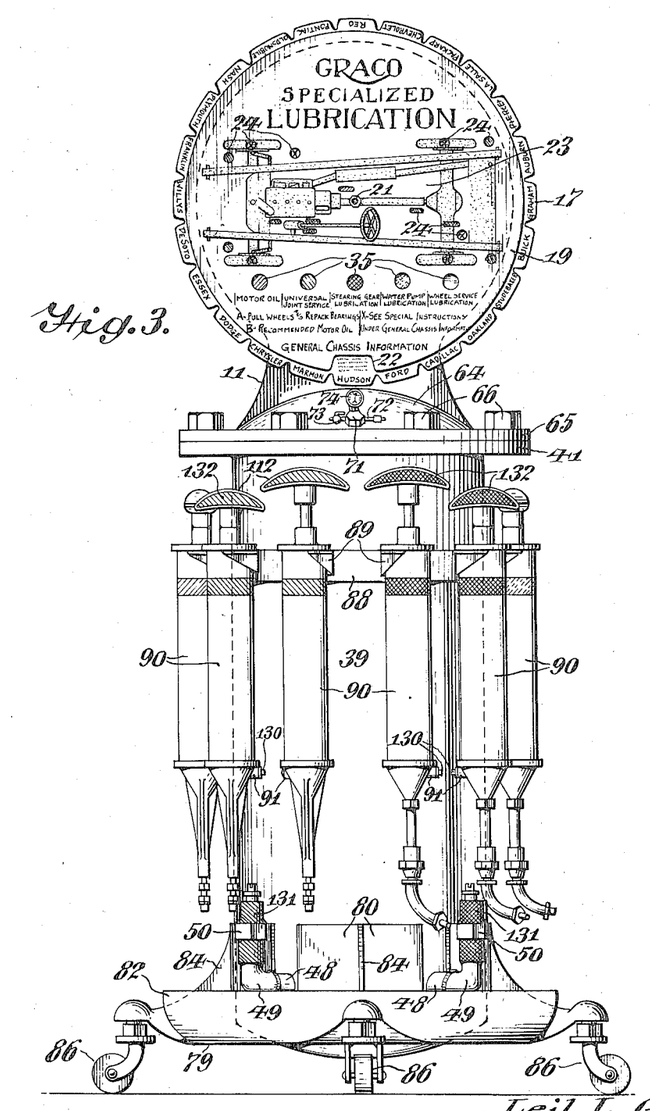
Figure 3 represents a front elevation of a modified form of my novel specialized lubrication system.
Figure 4:
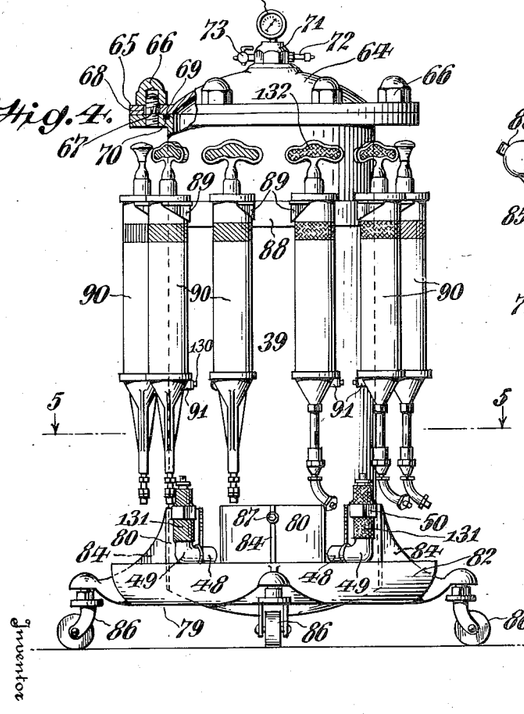
Figure 4 represents a front elevation of the multi-compartment lubricant reservoir alone.
Figures 5, 8:
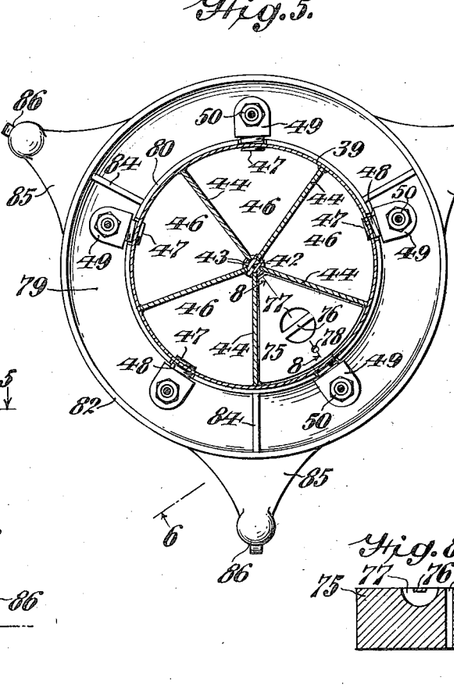
Figure 5 represents a section on line 5—5 of Figure 4.
Figure 8 represents a section on line 8—8 of Figure 5, particularly illustrating the fluid-follower block.

In the further embodiment or extension of my invention, shown particularly in Figures 3 to 6 inclusive, the base or support for the pivot supporting member is a novel lubricant reservoir and gun support 39, which is adapted to be moved about on casters or other similar wheels 86, as indicated particularly in Figures 3 and 5.

In this embodiment of my invention I provide a reservoir or tank 39, of generally cylindrical shape, and positioned upright. The reservoir tank 39 is permanently closed at its bottom by the bottom wall 40, which is preferably welded to the cylindrical shell 39, and an upper, annular and upwardly and laterally projecting flange 41 is permanently secured to the upper end of the cylindrical reservoir, tank or shell 39, also preferably by welding.

Within the cylindrical tank or shell 39 an axial post or stem 42 is provided, extending from the bottom of the tank upwardly to a suitable height. The post or stem 42 is slotted longitudinally thereof, as at 43, at suitable equal intervals, and a series of radial partition walls 44 are positioned in the corresponding slots 43; said partition walls 44 extending to the bottom of the tank as well as to the cylindrical side of the tank, and being welded thereto along the lines 45. The partition walls 44 and the stem 42 are preferably extended approximately to the level of the flange 41, thereby to divide the cylindrical tank 39 into a multiplicity of similar vertical compartments which radiate from the vertical axis of the tank. In the particular embodiment of my invention herein shown, I have illustrated a five-compartment tank, although it is to be understood that the number of compartments may be increased or decreased as may be desirable.

Near the bottom of each compartment 46, a discharge opening 47 is provided through the cylindrical side wall of the tank 39, and to each of these discharge openings a suitable conduit or pipe connection 48 is permanently or fixedly secured; said conduit or pipe connection 48 terminating in an upwardly extending conduit member 49. In each upwardly extending conduit member 49 an upright valve housing 50 is affixed or secured, as indicated particularly in Figure 6. The valve housing 50 is provided with an upright bore 51, within which the tubular valve stem 52 is slidably mounted in a vertical direction. The lower annular edge 53 of the bore 51 of the valve housing serves as a valve seat. The tubular valve stem 52 carries a valve head 54 at its lower end, having a conical valve surface which is adapted to seat against the annular valve seat 53, thereby to close the discharge opening from the particular compartment 46. The tubular valve stem 52 is slightly reduced in external diameter at its lower end just above the valve head 54, as indicated particularly in Figure 6, and one or several apertures are extended through the tubular wall thereof, where the external diameter is thus reduced, so as to provide a clear passage through the side wall of the tubular valve stem 52, into and through said valve stem, when the valve head 54 is unseated from the valve seat 53. The apertures are indicated by the numeral 55.

The valve body or housing 50 is also provided with an upper enlarged diameter bore 56 which is coaxial with respect to the bore 51, and which is adapted to house the helical compression spring 57 whereby the valve is normally maintained closed and which always tends to close the valve. The helical compression spring 57 is confined between the annular shoulder 58 of the valve housing 50, and the annular flange member 59, which is threadedly secured to the upper threaded end of the tubular valve stem 52, as will be seen particularly in Figure 6. The flange member 59 is provided with a tubular projection or nipple 60, extending upwardly therefrom, and an annular groove or channel 61 surrounding said tubular projection or nipple 60. Within the annular channel 61 a suitable packing or sealing gasket 62, of leather or rubber or the like, is provided. The upper end of the tubular nipple 60 is slotted, as at 63.

Figure 6:
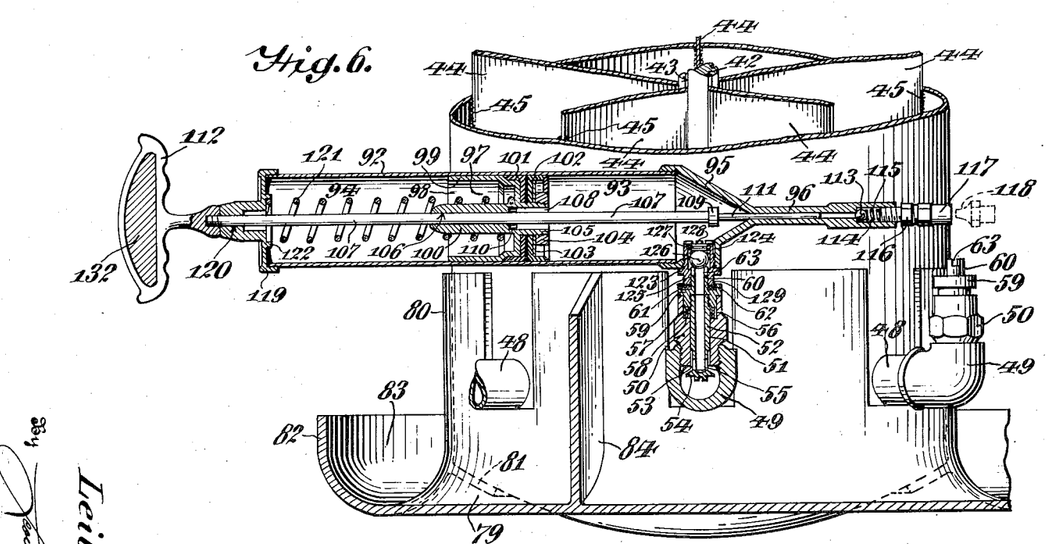
Figure 6 represents a fragmentary view, partly in section, on line 6—6 of Figure 5, showing the manner in which any one of the series of lubricant dispensing pumps or guns is refilled from the multi-compartment lubricant reservoir.
Figure 7:
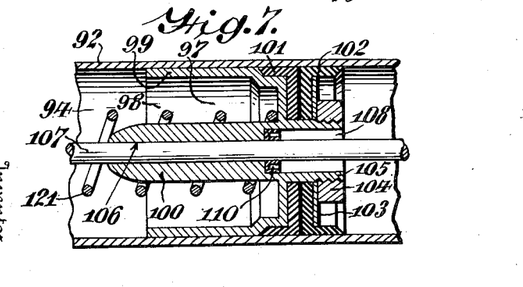
Figure 7 represents an enlarged fragmentary sectional view of the follower piston of the grease gun shown in Figure 4.
Figure 9:
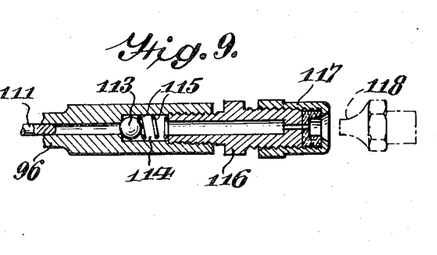
Figure 9 represents an enlarged fragmentary sectional view of the discharge nozzle of the grease gun shown in Figure 4.
Figure 10:
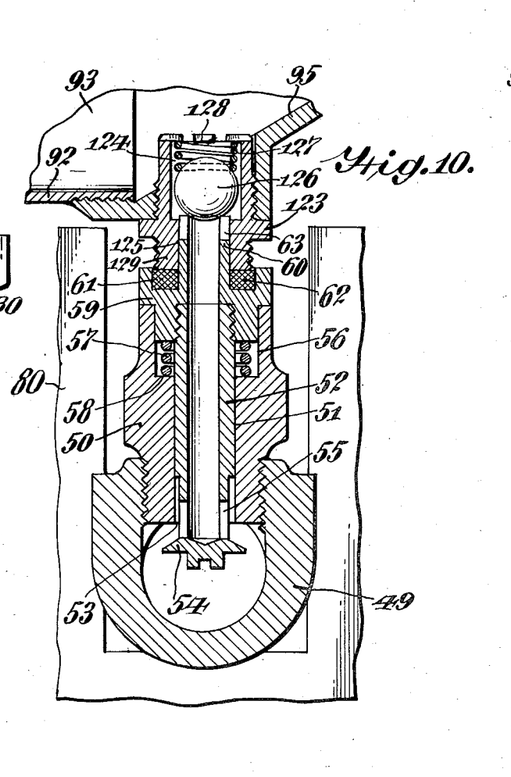
Figure 10 represents an enlarged fragmentary sectional view of refill means on tank and gun shown in Figure 4, in the operative position.
Figure 11:
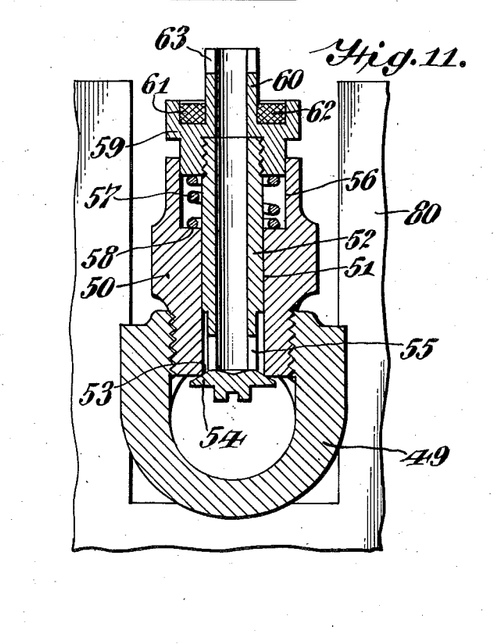
Figure 11 represents an enlarged fragmentary sectional view of a refill valve of the tank in the inoperative position.
Figure 12:
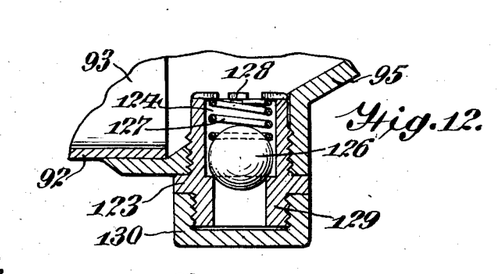
Figure 12 represents the refill valve of the gun in the inoperative position.
Figure 13:
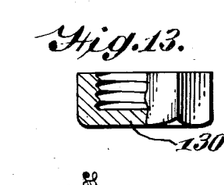
Figure 13 represents a view of the screw cap for concealing the refill valve of the gun while the latter is in use.

Whenever the flange member 59 is depressed from the position shown on the right side of Figure 6, to the position shown in the center of Figure 6, against the force of the helical compression spring 57, the valve 54 is unseated from the valve seat 53, and the fluid contents of the particular compartment 46 is permitted to flow out through the upright nipple 60.

A detachable cover member 64, having an annular flange 65, is superimposed upon the tank 39, and is detachably secured thereto by a series of cap nuts 66, threaded onto a corresponding series of stud bolts 67 which are permanently threaded into the flange 41, and which project through corresponding holes 68, in the flange 65. In order hermetically to seal the joint between the flanges 41 and 65 of the tank 39 and cover 64, respectively, a suitable annular sealing or packing gasket or ring 69 may be provided intermediate the flanges 41 and 65, said annular sealing ring or gasket being preferably seated within a suitable annular recess or groove 70 in the lower flange 41. The top of the cover member 64 is provided with a central threaded aperture, into which any suitable hollow air plug 71 is threadedly secured. The plug 71 is then provided with a series of lateral, threaded passageways, communicating with its interior, and hence communicating with the interior of the cover 64 and tank 39. Into one of these passageways any suitable or conventional air valve 72 is secured. Through this air valve the interior of the tank 39 may be charged with a supply of compressed air from any conventional source of compressed air supply, such as is commonly used for inflating automobile tires at service stations. By this means a uniform air pressure is applied to each of the several compartments of the tank 39, since the upper ends of the compartments 46 of the tank 39 are intercommunicating, because the partition walls 44 do not extend to, or contact with, the cover member 64. Thus, a common air chamber is formed above all the compartments 46.

Into another laterally threaded opening in the air plug 71, any suitable petcock or hand operable valve 73 is secured, whereby the air pressure within the tank may be relieved or released whenever it is desired to remove the cover 64 for the purpose of replenishing the supplies of lubricants within any one or more of the several compartments 46. Into another threaded opening in the plug 71 a suitable air gauge 74 may be secured, for visually indicating the amount of air pressure present in the tank at any time.

Into each of the compartments 46, a follower block or member 75 may be placed, on top of the lubricant supply contained within the compartment. The follower blocks 75 are of a horizontal cross-sectional shape, corresponding to the horizontal cross-sectional shape of the interior of the respective compartments;—being slightly smaller however, so as to fit within said compartments with a slight clearance. The follower blocks 75 are preferably formed of cast iron, and are of a suitable thickness, so as to be possessed of the desired weight. Handle members 76 may be formed integrally therewith, by forming a depression 77 in the top of the block on the opposite sides of, and beneath the handle member 76. One or more relief apertures 78 are extended through the block vertically, so as to equalize the air pressure above and beneath the block, thereby to permit the block to be removed more readily when it is desired to replenish the lubricant supply within any particular compartment. The follower blocks 75 may be placed on top of the lubricant supply in any of the compartments 46, and serve to maintain a uniform upper surface, or serve to level off the top of the lubricant supply, as the same is gradually discharged through the lower discharge openings and serves to prevent the lubricant, particularly when of a more plastic and viscous character, from adhering to the side walls of the compartments.

The tank 39 rests in, and is carried by, a cradle 79, which may be cast as an integral unit; said cradle 79 including the upright cylindrical walls 80 for giving lateral support to the tank 39, a suitable lower flange 81, for giving vertical support to the tank 39, and an outer annular, apron-like flange 82, which serves to form an annular trough 83 around the base of the tank 39. Reinforcing webs 84 are also formed integrally with the cylindrical side walls of the cradle, and connecting with the laterally projecting caster socket members 85. Suitable casters or other wheels 86 are provided to permit the unit to be moved about readily. A series of set screws 87 may be threaded through the cylindrical side walls 80 of the cradle 79, to lock the tank 39 within the cradle.

An annular band 88 is secured about the tank 39, and from the band 88, at suitable, uniformly spaced intervals, pairs of spring clips 89 extend laterally and in a generally radial direction. In the embodiment of my invention shown in the drawings, the number and spacing of the spring clips 89 is such that there are twice as many pairs of spring clips as there are discharge valves at the bottom of the tank, and there is a pair of spring clips above and on each side of each discharge valve.

Within each of the spring clips 79 a similar dispensing pump or "gun" 90 is detachably supported, as indicated in Figures 3 and 4. These dispensing pumps or "guns" are provided with lateral valve refill openings 91 which are adapted to coact with the series of valves 50 at the bottom of the tank 39, for the purpose of refilling the dispensing pumps or "guns" 90.

In Figure 6, I have shown a detailed cross-sectional view of one of these dispensing pumps or guns, in operative juxtaposition to the corresponding valve 50, showing the cooperative relation between gun and refill valve in the refilling position.

The dispensing pump or gun consists of a cylindrical shell-like body 92, the front interior portion 93 of which serves as the lubricant reservoir and the rear interior portion 94 of which serves as a spring compartment. The front end of the cylinder 92 is permanently closed by the conical member 95, which terminates in a small diameter cylindrical member 96, which is preferably disposed coaxially with respect to the cylinder 92. Within the cylinder 92 a follower piston 97 is slidably mounted, for exerting a low pressure upon the supply of lubricant in the front end of the cylinder 92. The follower piston 97 is composed of the metallic body 98, having the cylindrical guiding skirt portion 99, and the tubular rod guide member 100, all preferably formed integrally. To the front end of the metallic piston portion 98, a pair of oppositely disposed, cup-shaped leather or other suitably flexible washers or gaskets 101 and 102 are secured, by means of the washer 103 and the lock nut 104 threaded onto the front terminal portion 105 of the rod guide. The rod guide 100 is provided with a bore 106 which is adapted accurately but slidably to fit the piston rod 107 which extends therethrough. The front end of the tubular rod guide member 100 has an enlarged bore or chamber 108, which is adapted to receive the flange 109, of a correspondingly enlarged diameter at the front end of the piston rod 107. An annular sealing gasket 110, of U-shaped cross-section, is placed in the closed end of the enlarged chamber 108, surrounding the piston rod 107, thereby to form a seal between said rod 107 and the walls of the chamber 108.

The front end of the piston rod 107 continues in a piston 111, which fits operatively within the cylinder 96, and which is adapted to be retracted from, and clear of said cylinder 96, and again to re-enter said cylinder 96 with the successive reciprocatory operations of the handle 112 secured to the exterior end of the piston rod 107. A spring-pressed ball check valve 113, within a valve chamber 114, and actuated by a spring 115, serves to close the outlet of the cylinder 96 in one direction, while permitting it to open in the other direction. The screw threaded nipple 116, threaded into the valve chamber 114, serves to confine the spring 115 and the ball 113. Any suitable connector or nozzle member 117 may be carried on the free end of the nipple 116, for establishing connection with any lubricant receiving conduit of an automobile. In Figure 6, I have shown in dotted lines, a conventional form of fitting 118, commonly employed at the receiving end of lubricant conduits of automobiles, and the nozzle 117 may be of any suitable construction for establishing a temporary lubricant-tight connection between the discharge end of the pump 90 and the fitting 118.

The rear end of the cylinder 92 is closed by a cap 119, which may be permanently affixed thereto;—said cap 119 having an aperture 120 extending therethrough, in which the piston rod 107 is slidably mounted. The helical compression spring 121 is confined between the cap 119 and the piston 97, and urges said piston towards the front end of the cylinder 92, thereby exerting a pressure on the lubricant supply in front of said piston, sufficient to feed said lubricant into the high pressure cylinder 96, whenever the piston 111 is retracted clear of the cylinder 96. A slight annular ridge 122 serves to center the spring 121 at its rear end.

Disposed laterally with respect to the conical cap member 95 at the front of the cylinder 92, a refill nozzle 123 is provided, preferably threaded into a corresponding internally threaded lateral opening in said conical cap 95. The refill nozzle is provided with a valve chamber 124, and an orifice 125, of a lesser diameter. The annular edge of the shoulder formed between the two different diameters of the chamber 124 and the orifice 125, serves as a valve seat. The spring-pressed ball check valve 126 is disposed within the valve chamber 124 in operative juxtaposition to the annular valve seat, and is urged towards the latter by the helical compression spring 127 which rests against any suitable stationary abutment 128 at its other end. The outer annular end 129 of the refill nozzle 123 is of a diameter slightly less than the external diameter of the gasket 62, carried by the refill valve 50, and the distance between the end 129 of the refill nozzle and the valve seat therein is such with respect to the length of the nipple 60, that when the pump 90 is superimposed upon the valve 50 in the position shown in Figure 6, for the purpose of refilling the pump, the nipple 60 enters the refill nozzle 123 and first raises the ball check valve 126 from its valve seat, and thereafter the annular end 129 of the refill nozzle establishes a sealing contact with the gasket 62. As the pump is forced down further, after sealing contact has been established between the end 129 of the refill nozzle and the gasket 62 of the valve, the entire valve stem 52 is depressed, thereby unseating the valve 54 and permitting the passage of lubricant from the particular compartment 46 of the tank 39, through the valve stem 52 and through the refill nozzle 123, into the front lubricant compartment 93 of the cylinder 92 of the gun 90. The force of the lubricant entering the front end of the cylinder 92 forces the piston 97 towards the rear of the cylinder 92, against the force of the spring 121;—the latter being compressed. When the piston 97 has reached its rearward limit, the pump 90 may be removed from the valve 50, merely by lifting it up, and the check valve 126 in the refill nozzle 123 is thereby automatically closed and the lubricant supply which has been filled into the pump is thus confined therein under pressure of the spring 121, ready to be dispensed through the nozzle 117, by operation of the handle 112.

A cap 130 may be superimposed upon and threaded onto the exterior end of the refill nozzle 123, when the refilling operation has been completed, so as to keep dust and dirt out of the refill nozzle while the pump is in normal use.

In this modification of my invention, the pumps 90 are also provided with the color bands 28, or other suitable markings, and the valves 50 are similarly marked by color or otherwise, as indicated at 131. By this means, the correct refilling of each gun is assured. If desired, the handles 112 may be recessed on both sides to a suitable extent, as at 132, and colored or otherwise marked within said recesses, corresponding to the color markings on the cylinders, and corresponding to the markings on the valves. The gun on either side of every valve 50 is marked the same way as the valve.

In the modification of my invention shown particularly in Figure 3, I have mounted the composite chassis indicator directly on the cover 64, by securing the pivot support 11 upon the cover 64. In this modification of my invention, the entire unit becomes portable, and the operator has before him not only the chassis indicator, but also the guns, as well as the lubricant supplies corresponding to the guns, so that he may refill guns with facility and accuracy, in addition to applying the guns to the automobile with facility and accuracy.

By this means, the possibility of confusion is eliminated, either at the time when the guns are refilled in the modification shown in Figure 1, or when the reservoir is refilled in the modification shown in Figures 3, 4 and 6.

I am aware that my invention may be embodied in other specific forms without departing from the spirit or essential attributes thereof, and I therefore desire the present embodiments to be considered in all respects as illustrative and not restrictive, reference being had to the appended claims rather than to the foregoing description to indicate the scope of the invention.

Having thus described my invention, what I hereby claim as new and desire to secure by Letters Patent, is:

1. Lubricant apparatus including a multiple-compartment lubricant reservoir having a plurality of compartments exterior to each other, the upper ends of which are open with respect to each other and which are adapted separately to contain different lubricants, an upwardly opening outlet for each of said compartments communicating with the lower ends of the respective compartments for discharging some of the contents thereof into any portable lubricant dispensing pump, an inwardly opening check-valve associated with each outlet and adapted to be unseated by axial pressure manually exerted thereon by pressing the inlet of such lubricant dispensing pump against said outlet, and means common to said plurality of compartments for causing a flow of lubricant in any of the several compartments towards and through the respective outlets thereof at the will of the operator.

2. A generally cylindrical upright lubricant reservoir having the interior thereof divided into a plurality of upright and adjacent compartments exterior to each other, the upper ends of which are open with respect to each other, an outlet corresponding to each of said compartments and communicating with the lower ends thereof and terminating in an upwardly directed opening beneath the top thereof, an inwardly opening check-valve associated with each outlet, and means for causing a flow of fluid content of any of said compartments towards and through their respective outlets at the will of the operator.

3. Lubricating apparatus, including a multiple-compartment lubricant reservoir adapted separately to contain different lubricants, having the upper ends of the several compartments thereof open with respect to each other, each of said compartments having an outlet extending through the respective lower portions of the confining walls thereof, an inwardly opening check valve associated with each outlet and means common to said multiplicity of compartments for causing a flow of lubricant from any of the several compartments towards and through any of the separate outlets thereof at the will of the operator.

4. Lubricating apparatus, including a multiple-compartment lubricant reservoir adapted separately to contain different lubricants, an outlet for each of said compartments extending through the respective side walls thereof, an inwardly opening check valve associated with each outlet and means common to said multiplicity of compartments for causing a flow of lubricant from any of the several compartments towards and through any of the separate outlets thereof at the will of the operator.

5. In lubricating apparatus, in combination, a lubricant reservoir having a plurality of compartments adapted separately to contain different lubricants, an outlet for each of said compartments communicating with the respective lower ends thereof, for discharging the content thereof, a removable closure member common to said several compartments, and means for causing a flow of lubricant in any one of said several compartments towards and through the respective outlet thereof at the will of the operator.

6. In a lubricating apparatus, in combination, a lubricant reservoir having a plurality of compartments adapted separately to contain different lubricants, an outlet for each of said compartments communicating with the respective lower ends thereof, for discharging the contents thereof, a check-valve in each outlet adapted to be unseated by axial pressure exerted against the outlet, a removable closure member, common to said compartments, and means common to said plurality of compartments for causing a flow of lubricant from any of the several compartments towards and through any of the separate outlets at the will of the operator.

7. In a lubricating apparatus, a multiple-compartment tank having an outlet for each compartment communicating with the lower end thereof, projecting laterally therefrom and having its end directed upwardly, and supports for said tank so arranged that lines between adjacent supports enclose said outlets, each of said outlets including means for forming a fluid-tight joint with the inlet of a dispensing device which may be pressed thereagainst.

8. In a lubricating apparatus, a cylindrical multiple-compartment tank having an outlet for each of said compartments communicating with the lower end thereof, projecting laterally therefrom and having its end directed upwardly, and caster-type supports for said tank so arranged that lines between adjacent supports enclose said outlets, each of said outlets including means for forming a fluid-tight joint with the inlet of a dispensing device which may be pressed thereagainst.

9. In a lubricating apparatus, a lubricant filling tank having a lubricant outlet and an inwardly opening check valve therefor, and means whereby lubricant may pass from said tank to a dispensing device having a nozzle, said means comprising a tube arranged to slide in one direction to unseat said outlet valve and to slide in the opposite direction to permit said outlet valve to seat, said tube having means whereby lubricant may enter and flow out of its outer end when said outlet valve is unseated, and axial sealing means surrounding said tube and engageable by the nozzle of the dispensing device to make a tight joint therewith whereby lubricant may be conducted from the tank to the dispensing device by axial pressure exerted by the nozzle of the dispensing device on said sealing means.

LEIL L. GRAY.